(12) United States Patent
Galitsky

(10) Patent No.: US 11,599,725 B2
(45) Date of Patent: Mar. 7, 2023

(54) ACQUIRING NEW DEFINITIONS OF ENTITIES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 246 days.

(21) Appl. No.: 17/099,212

(22) Filed: Nov. 16, 2020

(65) Prior Publication Data

US 2021/0232771 A1 Jul. 29, 2021

Related U.S. Application Data

(60) Provisional application No. 62/965,647, filed on Jan. 24, 2020.

(51) Int. Cl.
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
None
See application file for complete search history.

(56) References Cited

U.S. PATENT DOCUMENTS

| | | | |
|---|---|---|---|
| 8,306,967 B2 | 11/2012 | Galitsky et al. | |
| 9,378,239 B1 | 6/2016 | Long et al. | |
| 9,836,529 B2 | 12/2017 | Zelevinsky et al. | |
| 10,699,708 B2 | 6/2020 | Lecue et al. | |
| 11,386,176 B2 | 7/2022 | Galitsky | |
| 2015/0185996 A1 | 7/2015 | Brown et al. | |
| 2016/0012126 A1 | 1/2016 | Franceschini et al. | |
| 2017/0139991 A1 | 5/2017 | Teletia et al. | |
| 2018/0060359 A1 | 3/2018 | Li et al. | |

(Continued)

OTHER PUBLICATIONS

Bovi et al., "Large-scale Information Extraction from Textual Definitions through Deep Syntactic and Semantic Analysis", Transactions of the Association for Computational Linguistics, 3:529-543, Nov. 16, 2020.

(Continued)

*Primary Examiner* — Quynh H Nguyen
(74) *Attorney, Agent, or Firm* — Kilpatrick Townsend & Stockton LLP

(57) ABSTRACT

Systems, devices, and methods discussed herein acquiring new definitions for entities from natural language queries. User input comprising a natural language expression may be obtained. A definiendum entity and one or more defining predicates may be identified from the natural language expression based at least in part on a predefined logical form template. An ontology may be search to determine whether the definiendum entity has a previously provided definition in the ontology. The defining predicates are converted to a logical form representation and optimized such that executing the optimized representation as a query against a knowledge base generates a number of results within a predefined acceptable range (e.g., meets/exceeds a lower threshold and/or meets/falls under an upper threshold). The optimized representation may then be added to the ontology.

20 Claims, 9 Drawing Sheets

(56) References Cited

U.S. PATENT DOCUMENTS

| | | | |
|---|---|---|---|
| 2018/0129739 A1 | 5/2018 | Jones et al. | |
| 2019/0199658 A1 | 6/2019 | Kim et al. | |
| 2019/0378019 A1* | 12/2019 | Scheutz | G06F 16/90335 |
| 2020/0028803 A1 | 1/2020 | Helmy | |
| 2020/0114207 A1 | 4/2020 | Weldemariam et al. | |
| 2022/0121884 A1* | 4/2022 | Zadeh | G06N 3/006 |

OTHER PUBLICATIONS

Cho et al., "Paraphrase Generation for Semi-Supervised Learning in NLU", In Proceedings of the Workshop on Methods for Optimizing and Evaluating Neural Language Generation, Jun. 6, 2019, 45-54.

Emani et al., "NALDO: From Natural Language Definitions to OWL Expressions", Data and Knowledge Engineering, Elsevier, 30 pages, Nov. 16, 2020.

Galitsky et al., "Improving Web Search Relevance with Learning Structure of Domain Concepts",.In: Clusters, orders, and trees: methods and applications, 2014, 37 pages.

Galitsky, "Natural Language Understanding with the Generality Feedback," DIMACS Technical Report 99-32, Rutgers University, Jun. 1999, 21 pages.

Galitsky, "Technique of Semantic Headers for Answering Questions in Tax Domain", iAskWeb, Inc., 6 pages, Nov. 16, 2020.

Galitsky, Technique of Semantic Headers: a Manual for Knowledge Engineers. DIMACS Tech. Report 2000-29, Rutgers University, Oct. 2000, 50 pages.

Galitsky, "Financial Advisor: Technique of Semantic Headers", iAskWeb, Inc., 6 pages, Nov. 16, 2020.

Galitsky, "A Tool for Extension and Restructuring Natural Language Question Answering Domains", In Hendtlass, T., Ali, M. (Eds.) Developments in Applied Artificial Intelligence 15th IEA/AIE 2002, Cairns, Australia, LNCS 2358, Springer, 11 pages.

Galitsky, "Least General Generalization of the Linguistic Structures", FCA4A workshop at IJCAI. CEUR-WS 2529, 2019, 5 pages.

Grefenstette, Explorations in Automatic Thesaurus Discovery. Kluwer Academic, Boston/London/Dordrecht, Sep. 16, 2014, 316 pages.

Hirst, "Semantic Interpretation and Ambiguity," Artificial Intelligence 34(2), pp. 131-177. Nov. 16, 2020.

Kate et al., "Learning to Transform Natural to Formal Languages", Proc Natl Conf Artif Intell 20: Jul. 2005, pp. 1062-1068.

Silva et al., "Building a Knowledge Graph from Natural Language Definitions for Interpretable Text Entailment Recognition", Jun. 20, 2018, 5 pages.

Zettlemoyer et al., "Learning to Map Sentences to Logical Form: Structured Classification with Probabilistic Categorial Grammars", 2012, 9 pages.

U.S. Appl. No. 16/983,993, Notice of Allowance dated Mar. 18, 2022, 19 pages.

U.S. Appl. No. 09/756,722, System, Method, and Computer Program Product for Responding to Natural Language Queries filed Jan. 10, 2001, 124 pages.

U.S. Appl. No. 16/426,878, Automated Building of Expanded Datasets for Training of Autonomous Agents filed May 30, 2019, 104 pages.

U.S. Appl. No. 16/983,993, First Action Interview Pilot Program Pre-Interview Communication dated Jan. 13, 2022, 4 pages.

Amiridze et al., Anti-Unification and Natural Language Processing, Fifth Workshop on Natural Language and Computer Science, Easy Chair Preprint No. 203, May 31, 2018, 12 pages.

Artzi et al., Broad-coverage CCG Semantic Parsing with AMR, Empirical Methods in Natural Language Processing, Sep. 2015, pp. 1699-1710.

Baral, Knowledge Representation, Reasoning and Declarative Problem Solving, Cambridge University Press, 2003, pp. 233-237.

Baral et al., Using Answer Set Programming to Answer Complex Queries, In: Workshop on pragmatics of question answering at HLT-NAAC2004, 2004, 6 pages.

Cai et al., Smatch: An Evaluation Metric for Semantic Feature Structures, In Proceedings of the 51st Annual Meeting of the Association for Computational Linguistics, vol. 2, Aug. 2013, pp. 748-752.

Damonte et al., An Incremental Parser for Abstract Meaning Representation, Proceedings of EACL, Jan. 2017, pp. 1-12.

De Cao, Question Answering by Reasoning Across Documents with Graph Convolutional Networks, Proceedings of the 2019 Conference of the North American Chapter of the Association for Computational Linguistics: Human Language Technologies, vol. 1, Jun. 2019, 12 pages.

Eremeev et al., Semantic-Based Text Complexity Measure, RANLP, Sep. 2019, pp. 1-6.

Galitsky, A Content Management System for Chatbots, Developing Enterprise Chatbots, Apr. 5, 2019, pp. 253-326.

Galitsky, A Tool for Efficient Content Compilation, Proceedings of COLING 2016, the 26th International Conference on Computational Linguistics: System Demonstrations, Dec. 11-17, 2016, pp. 198-202.

Galitsky et al., Applying Hybrid Reasoning to Mine for Associative Features in Biological Data, Journal of Biomedical Informatics, vol. 40, Issue 3, Jun. 2007, pp. 203-220.

Galitsky, Building a Repository of Background Knowledge Using Semantic Skeletons, Association for the Advancement of Artificial Intelligence Spring Symposium Series, Jan. 2006, 6 pages.

Galitsky, Disambiguation via Default Rules Under Answering Complex Questions, International Journal of Artificial Intelligence Tools, vol. 14, No. 1-2, 2004, 18 pages.

Galitsky et al., Finding Maximal Common Sub-Parse Thickets for Multi-Sentence Search, Graph Structures for Knowledge Representation and Reasoning, Jan. 2014, 19 pages.

Galitsky et al., From Generalization of Syntactic Parse Trees to Conceptual Graphs, Proceedings of the 18th international conference on Conceptual structures: from information to intelligence, Jul. 2010, pp. 185-190.

Galitsky, Generalization of Parse Trees for Iterative Taxonomy Learning, Information Sciences, vol. 329, Sep. 21, 2015, 43 pages.

Galitsky et al., Inferring the Semantic Properties of Sentences by Mining Syntactic Parse Trees, Data & Knowledge Engineering, vol. 81-82, Nov.-Dec. 2012, 44 pages.

Galitsky, Learning Discourse-Level Structures for Question Answering, Developing Enterprise Chatbots, Apr. 5, 2019, pp. 177-219.

Galitsky, Matching Parse Thickets for Open Domain Question Answering, Data & Knowledge Engineering, vol. 107, Dec. 9, 2016, pp. 24-50.

Galitsky et al., Matching Sets of Parse Trees for Answering Multi-Sentence Questions, Proceedings of Recent Advances in Natural Language Processing, Sep. 2013, pp. 285-293.

Galitsky, Merging Deductive and Inductive Reasoning for Processing Textual Descriptions of Inter-Human Conflicts, Journal of Intelligent Information Systems, vol. 27, No. 1, Jul. 2006, pp. 21-48.

Galitsky, Natural Language Question Answering System: Technique of Semantic Headers, Advanced Knowledge International, vol. 2, Apr. 2003, 333 pages.

Galitsky et al., On a Chatbot Providing Virtual Dialogues, Proceedings of Recent Advances in Natural Language Processing, Sep. 2-4, 2019, pp. 382-387.

Galitsky et al., Parse Thicket Representations for Answering Multi-Sentence Search, International Conference on Conceptual Structures, vol. 7735, Jan. 2013, 13 pages.

Galitsky, Reasoning Beyond the Mental World, Computational Autism, Oct. 2016, pp. 215-244.

Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.

Gazdar et al., Natural Language Processing in Prolog: An Introduction to Computational Linguistics, Computational Linguistics, vol. 16, No. 2, Jun. 1990, pp. 116-120.

Greene et al., Browsing Publication Data Using Tag Clouds Over Concept Lattices Constructed by Key-phrase Extraction, RuZA Workshop. Proceedings of EACL, Jan. 2015, pp. 1-13.

(56) References Cited

OTHER PUBLICATIONS

Harel et al., Learning Novelty-Aware Ranking of Answers to Complex Questions, WWW '19: The World Wide Web Conference, May 2019, pp. 2799-2805.

Jia et al., Adversarial Examples for Evaluating Reading Comprehension Systems, Empirical Methods in Natural Language Processing, Jul. 23, 2017, 11 pages.

Joty et al., Combining Intra- and Multi- Sentential Rhetorical Parsing for Document-level Discourse Analysis, Proceedings of the 51st Annual Meeting of the Association for Computational Linguistics, vol. 1, Aug. 2013, pp. 486-496.

Katzouris et al., Incremental Learning of Event Definitions with Inductive Logic Programming, Machine Learning, vol. 100, No. 2-3, Jun. 2015, pp. 555-585.

Kovalerchuk et al., Computing with Words Beyond Quantitative Words: Incongruity Modeling, 2015 Annual Conference of the North American Fuzzy Information Processing Society, Aug. 17-19, 2015, pp. 1-6.

Kratzwald et al., Adaptive Document Retrieval for Deep Question Answering, In Proceedings of the Conference on Empirical Methods in Natural Language Processing (EMNLP), Oct.-Nov. 2018, pp. 576-581.

Maybury, Adaptive Multimedia Information Access Ask Questions, Get Answers, First International Conference on Adaptive Hypertext, 2000, 7 pages.

Min et al., Efficient and Robust Question Answering from Minimal Context Over Documents, Proceedings of the 56th Annual Meeting of the Association for Computational Linguistics, Jul. 15-20, 2018, pp. 1725-1735.

Min et al., Multi-Hop Reading Comprehension Through Question Decomposition and Rescoring, Association for Computational Linguistics, Jun. 30, 2019, 13 pages.

Mitra et al., Addressing a Question Answering Challenge by Combining Statistical Methods with Inductive Rule Learning and Reasoning, Association for the Advancement of Artificial Intelligence, Feb. 12, 2016, 7 pages.

Moldovan et al., Performance Issues and Error Analysis in an Open-Domain Question Answering System, 40th Annual Meeting of the Association for Computational Linguistics, Jul. 2002, pp. 33-40.

Muggleton, Inductive Logic Programming, New Generation Computing, vol. 8, 1991, pp. 295-318.

Ng et al., Question Answering Using a Large Text Database: A Machine Learning Approach, Proceedings of the 2001 Conference on Empirical Methods in Natural Language Processing, 2001, 7 pages.

Nie et al., Dissent: Sentence Representation Learning from Explicit Discourse Relations, Proceedings of the 57th Annual Meeting of the Association for Computational Linguistics, Available online at https://aclanthology.org/P19-1442.pdf, Oct. 12, 2017, pp. 4497-4510.

Ourioupina et al., Application of Default Reasoning to Semantic Processing Under Question-Answering, DIMACS Tech Report, May 16, 2001.

Palmer et al., Semiink: Linking Propbank, Verbnet and Framenet, In Proceedings of the Generative Lexicon Conference, Sep. 17, 2009, pp. 1-54.

Pasca, Open-Domain Question Answering from Large Text Collections, Journal of Logic, Language and Information, vol. 13, No. 3, 2004, pp. 373-376.

Pfenning, Unification and Anti-Unification in the Calculus of Constructions, Sixth Annual Institute of Electrical and Electronics Engineers Symposium on Logic in Computer Science, Jul. 15, 1991, 12 pages.

Qi et al., Answering Complex Open-domain Questions Through Iterative Query Generation, Proceedings of the 2019 Conference on Empirical Methods in Natural Language Processing and the 9th International Joint Conference on Natural Language Processing, 2019, pp. 2590-2602.

Ray, Nonmonotonic Abductive Inductive Learning, Journal of Applied Logic, vol. 7, Issue 3, Sep. 2009, pp. 329-340.

Rus, High Precision Logic Form Transformation, International Journal on Artificial Intelligence Tools, vol. 11, No. 3, Oct. 2001, 8 pages.

Sidorov et al., Syntactic Dependency-Based N-Grams as Classification Features, Proceedings of the 11th Mexican international conference on Advances in Computational Intelligence, Oct. 2012, 11 pages.

Surdeanu et al., Two Practical Rhetorical Structure Theory Parsers, Proceedings of the Conference of the North American Chapter of the Association for Computational Linguistics—Human Language Technologies: Software Demonstrations (NAACL HLT), Jun. 1, 2015, pp. 1-5.

Vo et al., A Multi-Layer System for Semantic Textual Similarity, 8th International Conference on Knowledge Discovery and Information, vol. 1, Nov. 2016, 12 pages.

Werling et al., Robust Subgraph Generation Improves Abstract Meaning Representation Parsing, In Proceedings of the 53rd Annual Meeting of the ACL, Jun. 10, 2015, pp. 982-991.

Zong et al., An Answer Extraction Method Based on Discourse Structure and Rank Learning, 7th International Conference on Natural Language Processing and Knowledge Engineering (NLP-KE), Nov. 27-29, 2011, pp. 132-139.

U.S. Appl. No. 17/016,223, Non-Final Office Action dated Aug. 17, 2022, 18 pages.

* cited by examiner

ACQUIRING NEW DEFINITIONS OF ENTITIES

CROSS-REFERENCE TO RELATED APPLICATIONS

This non-provisional application claims priority to U.S. Patent Application No. 62/965,647, filed on Jan. 24, 2020, entitled "Acquiring New Definitions of Entities," the disclosure of which is herein incorporated by reference in its entirety for all purposes.

TECHNICAL FIELD

This disclosure is generally concerned with linguistics. More specifically, this disclosure relates to acquiring new definitions of entities from natural language queries.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF SUMMARY

Aspects of the present disclosure relate to acquiring new definitions of entities from natural language expressions. In at least one embodiment, a method is disclosed for generating a new definition. The method may comprise obtaining user input comprising a natural language expression. The method may include identifying a definiendum entity from the natural language expression and one or more defining predicates of the natural language expression based at least in part on a predefined logical form template. In some embodiments, the predefined logical form template indicates common semantic patterns of definitions. The definiendum entity may be a term that is being defined by a definition comprising the one or more defining predicates. The method may further comprise converting the one or more defining predicates from text to a logical form representation. The method may further comprise modifying, through a generality control process, the logical form representation into an optimized logical form representation such that executing the optimized logical form representation as a query against a knowledge base generates a number of results within a predefined acceptable range. The method may comprise adding the optimized logical form representation of the definition to the ontology.

In at least one embodiment, a computing device is disclosed. The computing device may comprise a computer-readable medium storing non-transitory computer-executable program instructions and a processing device communicatively coupled to the computer-readable medium for executing the non-transitory computer-executable program instructions. In some embodiments, executing the non-transitory computer-executable program instructions with the processing device causes the computing device to perform the method disclosed above.

In at least one embodiment, a non-transitory computer-readable storage medium storing computer-executable program instructions for generating an automated answer to a question is disclosed. In some embodiments, executing the program instructions by the processing device causes the processing device to perform the method disclosed above.

DETAILED DESCRIPTION

Figure 1:
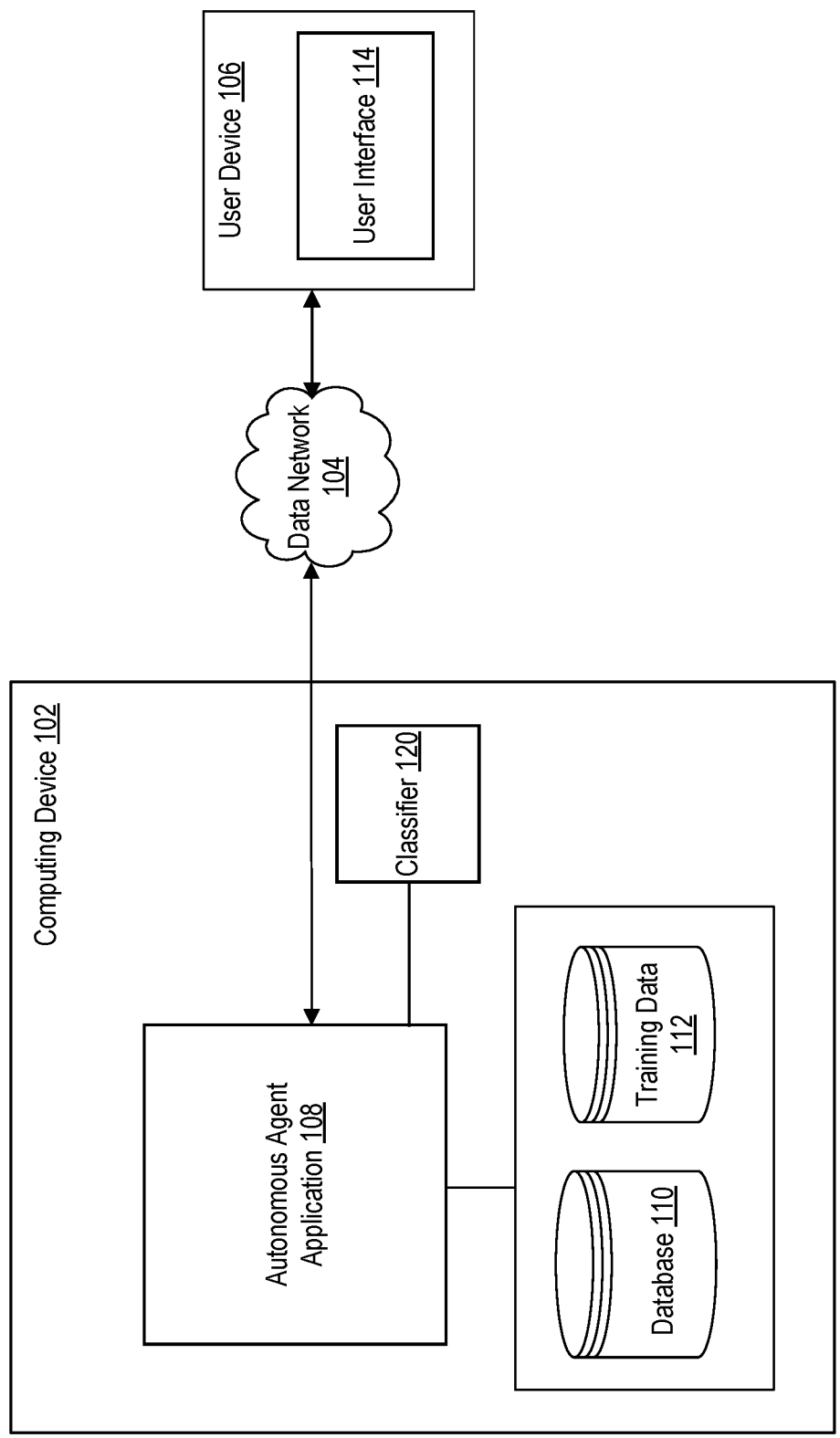
FIG. 1 depicts an autonomous agent environment, in accordance with at least one embodiment.

Aspects of the present disclosure relate to generating new definitions for an ontology from natural language queries. A user may provide definitions within natural language expressions. This flexibility feature may be utilized by the user to teach a system novel entities, facts and assertions expressed in these entities. This feature is lacking by not only major search engines but also by virtual assistants as well. As used herein, the term "natural language query" may include a question expressed in natural language and/or a natural language expression that may include an entity definition. In some embodiments, the definition understanding system described herein is included within a question/answering system configured to provide answers from a knowledge base to natural language queries.

The problem of knowledge acquisition lies at the core of natural language processing (NLP). The usefulness of domain ontologies in various fields is well established. A domain ontology (also referred to as an "ontology" for brevity) defines a set of representational primitives with which to model domain-specific definitions of terms. Indeed, such ontologies are a pivotal piece when dealing with heterogeneity or complex semantic issues. However, building ontologies is a difficult and time-consuming task that usually combining the knowledge of domain experts with the skills of ontology engineers. This bottleneck currently constitutes a real obstacle for the adoption of semantic technologies into industrial applications such as customer relationship management (CRM).

Various techniques are disclosed herein for automatically building and extending an ontology given natural language (NL) definitions provided by users. Relying on a conceptual model based on a set of semantic roles for definitions, each fragment of a defining part of a definition obtained from a natural language expression can be classified according to its relation to the entity being defined (referred to as a "definiendum") and the classified data can be converted into a logic representation and added to the ontology. A user's ability to define new entity or fact so all users can then use this definition and access this fact is badly needed feature of question/answering (Q/A) systems and conversational agents.

A formal representation if definition expression, can be considered to be correct if is accepted by domain experts as it is. The main issues to tackle the problem of automatic formalization of NL definitions are enumerated below.

1) Identification of individual definitions from a sentence including multiple definitions. In practice, a sentence may contain more than one definition. So, when one wants to automatically enrich an ontology, a first challenge is to automatically identify and distinguish these definitions form one another. For instance, the sentence 'An Italian pizza is a pizza which has toppings of tomato and a souvlaki pizza is the one done with Tzatziki sauce" contains two distinct definitions.

2) Identification of the defined concept and its definition. The same definition can have multiple wordings. The challenge here is to identify the concept that is defined and the phrases that give the definition itself. For example, all the following sentences define a 'cell space'.

A cell space is an anatomical space that is part of a healthy cell;

An anatomical space that is part of a healthy cell is a cell space;

If an anatomical space is part of a healthy cell then it is a cell space.

3) Entity linking. The formalization task requires building a formal expression of concepts using entities provided in the domain ontology. Hence, a challenge consists of linking the terms of the definition with the corresponding entities in the ontology. This linking can be:

Default, which means that there are some similarities between the surface form of the term of the definition and the one of the ontology's entity. For example, when the definition 'An American pizza is a pizza which has toppings of tomato' is formalized, against the pizza ontology, as ItalianPizza(p) pizza(p) & ∃Topping topping(p, cheese Topping), we consider the linking of the entity cheese to cheeseTopping as default. Formally, default linking can be defined as: Given a string s, an ontology O, identify entity e∈O so that s refers toe. In this task, s and labels of e share the common stem.

Strong, to denote linking where there is no similarity between the term of the definition and its formal correspondence in the ontology. When the definition 'A Greek pizza is a pizza made with meat such as lamb' is formalized within the pizza ontology, as greekPizza(p) pizza(p) & ∃ lambTopping topping(p, lambTopping) & meat(lambTopping) we associate lamb as meat as a strong entity linking. Formally, a strong linking can be defined for string s and an ontology O as an identification of entity e∈O so that s refers to a hypothetical entity e, not found in O, but semantically related to e.

4) Pruning. When an NL definition of a concept is transformed into a formal expression, some terms of the definition are redundant. A formalization procedure needs to remove these phrases. Domain experts, who validate the formalization, assume that those terms are meaningless for this definition. For example, when the definition "A cell space is an anatomical space that is part of a healthy cell" is formalized as cellSpace(X):—AnatomicalSpace (X) & cell(Cell) & ∃part of(X, Cell), the word healthy is pruned. Formally, pruning can be defined as: Given a string s, an ontology O, discard all the words in s so that the intended matching of s to entity e can be done correctly without these words.

Processing NL definitions of new entities (predicates) includes significantly more difficulties of both a syntactical and logical nature than query processing. It is hard, not only for a machine but for a human as well, to formulate a definition of an entity that can be usable in multiple contexts. The task of the definition understanding (DU) system is not only to translate a definition from NL to a logical form properly. In addition, the DU system needs to model the current predicate structure (which a user might not be aware of), and to identify a position for the new entity or its new instance in the domain ontology. Utilizing the techniques discussed herein, users may, in addition to asking questions, define new objects and entities, as well as introducing new facts, recommendations and advices.

FIG. 1 depicts autonomous agent environment 100, in accordance with at least one embodiment.

FIG. 1 depicts computing device 102, data network 104, and user device 106. The computing device 102 may further include database 110 and training data 112. User device 106 may include user interface 114. Training data 112 may be utilized to train classifier 120 to identify answers from corresponding queries (e.g., natural language queries also referred to as "questions") provided at user interface 114.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

The classifier 120 may be previously trained by the computing device 102 and/or any suitable system to identify output data from input data. The classifier 120 may include one or more predictive models, classification models, neural networks, and so on. In some embodiments, classifier 120 may be trained utilizing any suitable supervised learning algorithm in which a function (sometimes referred to as "a model") is trained to identify output (e.g., an answer) from provided input (e.g., a natural language query/expression) based at least in part on a training data set including input/output pairs (e.g., other input data previously paired with corresponding output decisions). The classifier 120 can be utilized in any suitable context to provide any suitable decision from input data. In some embodiments, the autonomous agent application 108 may be configured to train the classifier 120 from training data 112 (e.g., a number of example question (input) and answer (output) pairs), or the autonomous agent application 108 may obtain the (already trained) classifier 120 from memory or another system. In some embodiments, the output (e.g., an answer) provided by the classifier 120 may include a decision log which includes the specific factors (e.g., specific user data) which influenced the decision of which answer to provide. In some embodiments, the output may be stored in database 110 and/or the input utilized by the classifier 120 and the corresponding output provided by the classifier 120 may be stored as additional training data within training data 112.

In an example, the database 110 may include a set of answers. Each answer may be indexed with indices that have been previously generated by the computing device 102 or another system. A subsequent natural language query may be received by the autonomous agent application 108. The natural language query may be provided by the autonomous agent application 108 to the classifier 120 to identify an output (e.g., an answer) from database 110. The answer may be provided by the autonomous agent application 108 in response to the natural language query. The autonomous agent application 108 may utilize the classifier 120 and/or the ontology of database 110 any suitable number of times to provide dialog management of answers provided in response to various queries received from the user device 106.

In some embodiments, the database 110 may include an ontology. An ontology may be a tree-like structure that organizes entities into categories, subclasses, and instances and establishes connections between leaves of the tree that represent relationships between entities. An ontology may be domain-specific (e.g., finance, law, business, science, etc.). In some embodiments, the ontology, among other features, can provide synonym matching such that terms of a natural language query (or expression) can be substituted with synonyms obtained from the ontology prior to being provided as input to classifier 120 (or a query to a search engine).

In some embodiments, the autonomous agent application 108 or another system, computing device, or component, may be configured to understand definitions from input (e.g., a natural language expression) received from user device 106. In this context, the autonomous agent application 108 (or the other system, computing device, or component) may be referred to as a definition understanding (DU) system.

Figure 2:
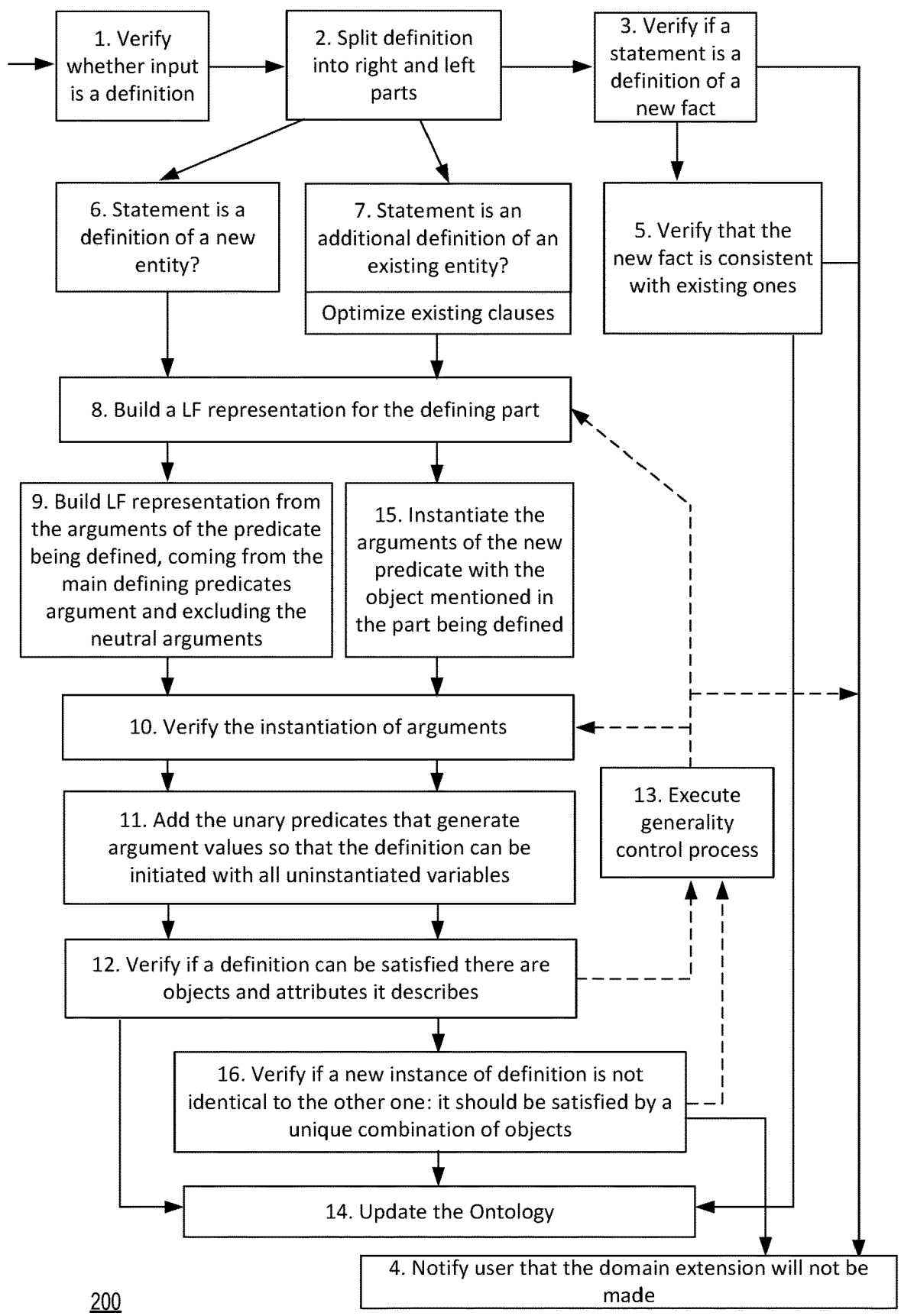
FIG. 2 is a block diagram depicting a method for generating a new definition for an ontology, according to at least one embodiment.

FIG. 2 is a block diagram depicting a method 200 for generating a new definition for an ontology, according to at least one embodiment.

At step 1, a definition understanding (DU) system must verify whether a statement is a definition. One way by which the DU system may verify whether the statement is a definition is to tokenize the input (e.g., an input natural language expression provided by the user device 106 of FIG. 1, referred to as an "input NL expression"). An input NL expression for a definition is first recognized with respect to being a definition of an entity (new or existing) 'A circle is a set of points each of which has a fixed distance from the center (a given point))', a fact 'Circle c has radius 4', or neither What is the radius of circle d?', based on syntactic properties of this expression. If there is a failure in the consecutive steps of recognition or in the forming of a definition, the user is notified about the DU system's inability to understand the definition. Such a situation may be caused by an unclear phrasing, system's unfamiliarity with mentioned lexical units, or a lack of knowledge of the proper synonyms, as well as the incompatibility of suggested definition with the domain. If the NL expression is identified as a definition, the method may proceed to step 2. If the NL expression is identified as a query, the method 200 may cease and the query may be processed by the autonomous agent application 108 of FIG. 1 as described above in FIG. 1.

At step 2, the DU system may split the definition into a left and right parts. The DU system is configured to identify the defining part and a definiendum (the part being defined). By way of example, for the input "a circle is a set of points each of which has a fixed distance from the center," the defining part (the right part) may include "a set of points each of which has a fixed distance from the center') and the definiendum (the left part) may include "a circle is". The DU system may utilize one or more predefined logical form templates to 1) identify the input as a definition and 2) to split the definition into the left and right parts.

In some embodiments, the input NL expression is a compound sentence that contains parts linked with when, where, if, is a etc. If so, the method may proceed under the assumption that the left part contains the definiendum entity (being defined), and the right part includes the defining predicates. For example, in the sentences below, the first one introduces the object Minsk and the fact that Minsk is the capital of Belarus, the second and third sentences introduce only the fact itself, assuming the DU system knows Minsk: capital(minsk, belarus).

Minsk is the city; it is the capital of Belarus.
Minsk is the capital of Belarus.
The capital of Belarus is such city as Minsk.

Also, a sentence may introduce the signature for a predicate without specifying its meaning: (e.g., delivery from country to country of a product in a year→deliver(xcountryFrom, xcountryTo, xproduct, xyear).

To recognize what kind of definition the DU system is dealing with, it is important to properly determine the boundary between the part sentence with the definiendum entity (including words referencing its attributes) and the defining part. The definition may introduce a new entity as well as a new definition of an existing one. Also, in specifying a new entity, a definition may introduce a new link between existing objects and also a new object (or a set of objects) as an argument of this entity.

An example of the former kind of definition may be as follows: A president's residence is a capital of the country where its president lives. The query representation for this definition of president_residence we intend to obtain is:

president_residence(Person, City):—capital(City, Country), president(Person, Country) or president_residence (Person, Country, City):—capital(City, Country), president(Person, Country).

The entities in the defining part are supposed to be linked by arguments of predicates. The linking variables may (e.g., City) or may not (e.g., Country in the definition above) go into the arguments of the newly created predicate (as in the clauses above). To form the arguments of the newly created predicate, variables need to connect two or more predicates in the defining part. In the example above, Country is the linking variable that links the predicates president and capital with their respective arguments Person and City.

If the user wants to introduce a specific instance for a president's residence in case 'the president has to live abroad' for some reason: President's residence is a city abroad if the city he lives is not the capital of the president's country, president_residence(Person, City_abroad):—capital(City, Country), live(Person, City_abroad), president(Person, Country), City=City_abroad.

In this case the DU system needs to introduce constraints for the same pair of arguments as it has done for the first instance of the definition of president_residence. However, there are different predicates in the defining component, which now includes live. The expression city is not the capital is translated into capital(City, Country), City=City_abroad. As in the previous definition, variable Country links the predicates capital and president, and variable Person links predicates live and president, so all three defining predicates are linked. Both variables City and City_abroad would be present as arguments of president_residence, in addition to Person, if it were the first instance of the definition. Since we have already formed the binary predicate president_residence and want to keep its semantics, when adding definition instances, we attempt not add the variable City_abroad to the list of arguments.

The user can also introduce a new object via a predicate. For example, a domain needs a definition of NATO block and what is currently know is that it is a place of gathering the presidents from Europe and US. Defining an entity in an ontology includes establishing its links with the other entities: NATO block is linked to gathering of presidents. In this example, other blocks except NATO are not used, so the predicate targets the introduction of a single object NATO.

block(nato, Country):—gather(Person, City, Country), president(Person, Country), (belong(Country, europe); Country=us).

Country here means the countries which are members of NATO (and not the NATO location that is not mentioned in the defining part). This definition would be more efficient if a list of countries would be considered, but it is difficult to build clauses in terms of lists.

Thus, in some embodiments, the DU system assumes that an input NL expression includes two parts of a compound sentence, one of which contains a definiendum predicate, and the second part begins from if, when, as only as and includes the defining predicates. To properly recognize the definitions, one or more predefined logical form templates may be used which include the above components and the words with special functions within a definition.

Figure 3:
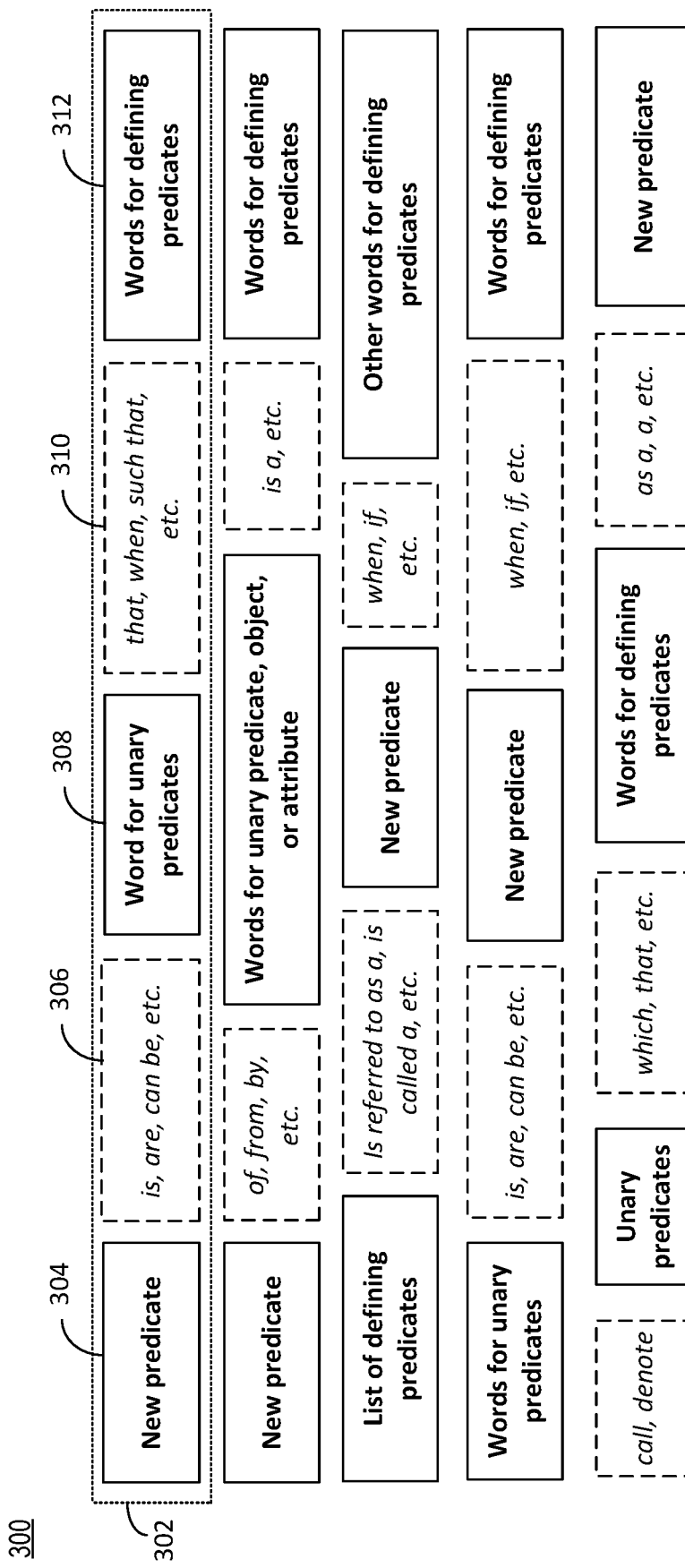
FIG. 3 illustrates a number of predefined logical form templates, according to at least one embodiment.

FIG. 3 illustrates a number of predefined logical form templates, according to at least one embodiment. As depicted in FIG. 3, words that map to predicates are shown in bold. Each bolded predicate may correspond to a definiendum (e.g., labeled as a new predicate), a unary predicate, a predicate naming an introduced object or attribute, and a defining predicate (e.g., a predicate that defines the definiendum). Some examples of linking words are presented in FIG. 3 as well as depicted in italics. A limited number of syntactic templates (e.g., predefined logical form templates) may be utilized to cover the majority of ways users typically formulate definitions of entities.

In some embodiments, the DU system may be configured to perform semantic parsing on the input NL expression to convert the expression to abstract meaning representation (AMR).

Figure 4:
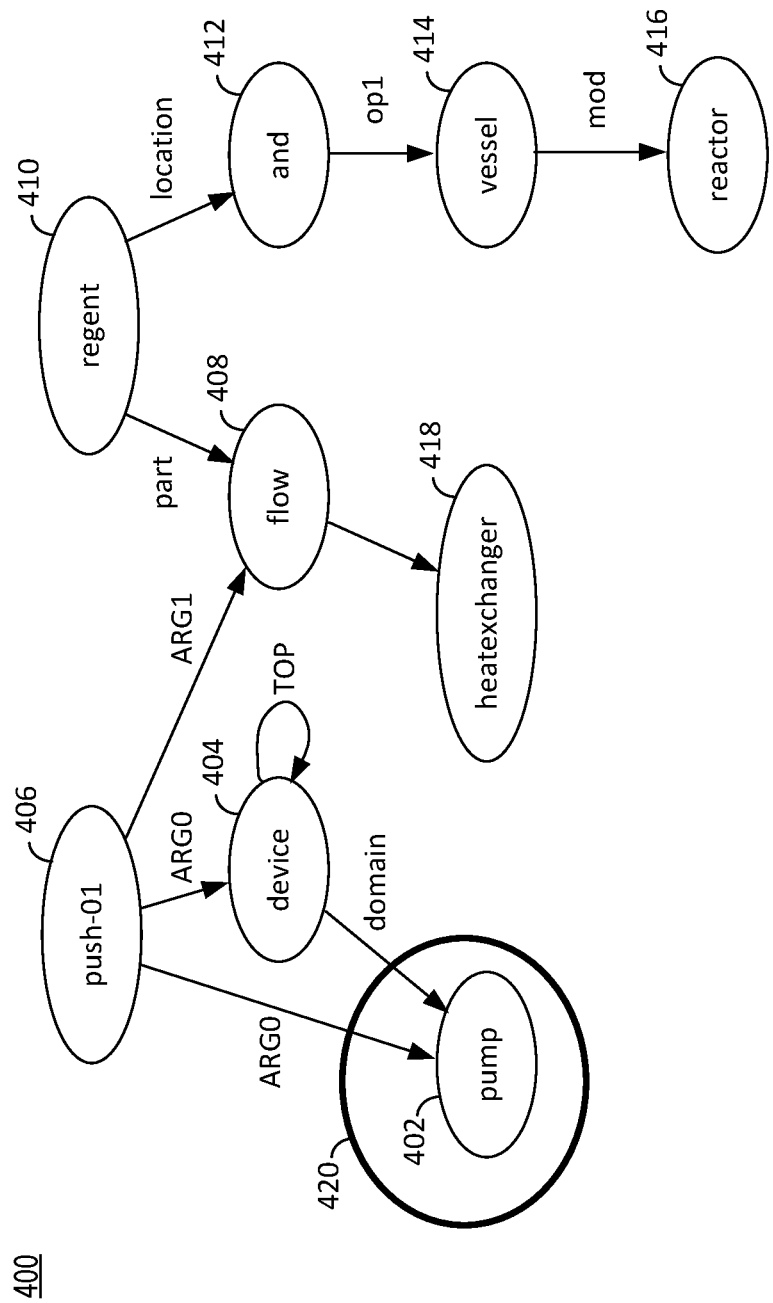
FIG. 4 is a directed acyclic graph illustrating an example abstract meaning representation of a sentence, according to at least one embodiment.

FIG. 4 is a directed acyclic graph (DAG) 400 illustrating an example abstract meaning representation of a sentence, according to at least one embodiment. By way of example, the DAG 400 may illustrate the AMR of the sentence: A pump is a device that pushes the flows of reagents through the reactor vessels and heatexchangers: pump(Xapp, Xflow):—push(Xapp, Xflow), (reactor(Xapp, Xflow); heatexchanger(Xapp, Xflow)). This is an introduction of the entity pump as a device Xapp (entity, expressed by a unary predicate such that the DU system is supposed to be already familiar with it) with certain properties and/or functions. Note that and in the definition has the meaning of "either . . . or". This can be deduced since the predicates reactor and heatexchanger are symmetric with respect to the transmission of instantiated variables Xapp and Xflow from predicate push. Translating and into conjunction in this sentence would violate this property of being symmetric. Each node of the DAG 400 (or words of the input NL expression) may be mapped to an element of a predefined logical form template such as the predefined logical form template 302 of FIG. 3. By way of example, node 402 (e.g., "pump") may be mapped to element 304, "is a" may be mapped to element 306, node 404 "device" may be mapped to element 308, "that" may be mapped to element 310, and nodes 406-418 may be mapped to element 312. The definiendum 420 is determined to include node 402, while the defining part of the input is considered to include nodes 404-418.

Definitions may come in a variety of forms as depicted in FIG. 3's templates. By way of example, the following may include a number of additional definition examples.

1) Stopping the engine under excessive temperature is referred to as its emergency shut-off when the valve is being closed: shut_off(Xapp, emergency):—engine (Xapp, stop), temperature(Xapp, Xflow, Xtemp), excessive(Xtemp), valve(Xapp, close). In this definition engine(_), is the unary predicate that characterizes a device to be shut_off and temperature(_,_,_) may serve as a main defining predicate.

2) A pump is not operational if it cannot start when it is necessary to increase the pressure not operational (Xpump) pump(Xpump), not start(Xpump), pressure (Xpump, increase, _). It is not just the negation as a failure paradigm that keeps us from defining the negation of operational. Instead of defining the negation of a predicate, a new definition may be defined for the "negative" state and then define it via the positive one explicitly not operational(Xpump):—not operational (Xpump).

3) We call a device that exchanges energy between the flows a heatexchanger. heatexchanger(Xapp, Xflow) device(Xapp), temperature(Xapp, Xflow, Xtemp), flow (Xflow). The DU system may take into account that energy and temperature are synonyms here and ignore plural for flows, attempting to approximate the real world in this definition.

4) A person informs another person about a subject if he wants the other person to know that subject, believes that he does not know the subject yet and also believes that the other person want to know the subject. This definition of a mental entity has neither unary nor main defining predicates, also, it consists of the metapredicates (the last argument ranges over the arbitrary formula): inform(Who, Whom, What):—want(Who, know (Whom, What)), believe(Who, not know(Whom, What)), believe(Who, want(Whom, know(Whom, What))).

5) SEP IRA is a retirement plan for self-employed individuals without becoming involved in more complex retirement plans. ira(sep):—retirement(plan, self_employed), not retirement(plan, complex).

Returning to FIG. 2, if the input NL expression does not match any of the predefined logical form templates (e.g., the example logical form templates illustrated in FIG. 3), the method may proceed to step 3, where the DU system may verify if the statement is a definition of a new fact. In other words, if the split fails, the DU system may determine that the input is a fact (circle c has radius 4'). If this input text is not recognized as a fact, the DU system may proceed to step 4, where the user may be notified that the domain extension will not be made. Otherwise, the method may proceed to step 5, where the system can verify that the fact, circle c has radius 4, represented as radius(c, 4), does not contradict with any formalized fact such as radius(c, 5). This step is based on a rule specific to predicate radius stating that it is a single value, not a list or multiple values. If the fact conflict with other facts of the domain, the DU system may proceed to step 4 to notify the user that the domain extension will not be made.

If, however, the split in step 2 was successful, the DU system may begin parallel processing of steps 6 and 7. At step 6, the DU system may determine whether the statement provided in the input NL expression is a definition of a new entity. For example, at step 6, the DU system may search the ontology for an entity corresponding to the identified left part (e.g., the definiendum, "pump" as provided in the example of FIG. 4. If the entity is not found, the DU system may proceed to step 8.

At step 8, the defining parts of the input NL expression (e.g., the right part identified at step 2) may be converted to logical form representation using conventional conversion techniques. Firstly, the signature of the definiendum predicate is built. All parameters in the definiendum part (which are also present in defining part) form the arguments of the definiendum predicate. Those parameters which are instantiated (to have specific values) in the defining part propagate to the definiendum predicate and form the constant values of its arguments. For the definition "Latent *tuberculosis* of lungs without symptoms is an infectious disease usually caused by *Mycobacterium tuberculosis* bacteria." The definiendum part predicate=*tuberculosis* with a pattern=*tuberculosis*(Latent_type, Symptoms, Bacteria, Disease, Organ).

At step 9, when the definition is of a new entity, the logical form representation may be built from the arguments of the predicate being defined, coming from the main defining predicates argument and excluding the neutral arguments. In the ongoing *tuberculosis* example, the defining part=disease (Disease, Bacteria, Symptoms, Latent_type, Organ), bacteria (Bacteria, *Mycobacterium_tuberculosis*)
Argument propagation from right to left=Disease, Bacteria, Symptoms
Arguments already in definiendum: latent→Latent_type, lungs→Organ At step 10, the DU system may verify the instantiation of the arguments of step 9. By way of example, all arguments in *tuberculosis*(Latent_type, Symptoms, Bacteria, Disease, Organ) must obtain their values in the defining part: disease (Disease, Bacteria, Symptoms, Latent_type, Organ), bacteria (Bacteria, *Mycobacterium_tuberculosis*) predicates disease and bacteria are designed in the way so that the bolded variable are yielded by the respective clauses of these predicates. If not then the whole new definition will not work. To solve this problem, at step 11, the DU system adds unary predicate to derive the desired values: disease(Disease, Bacteria, Symptoms, Latent_type, Organ), symptoms (Symptoms), bacteria (Bacteria, *Mycobacterium_tuberculosis*).

At step 12, the DU system may verify if the definition can be satisfied by determining there are objects and attributes it described. By way of example, to verify if the definition can be satisfied, the DU system may proceed to execute a process for generality control at step 13.

Figure 5:
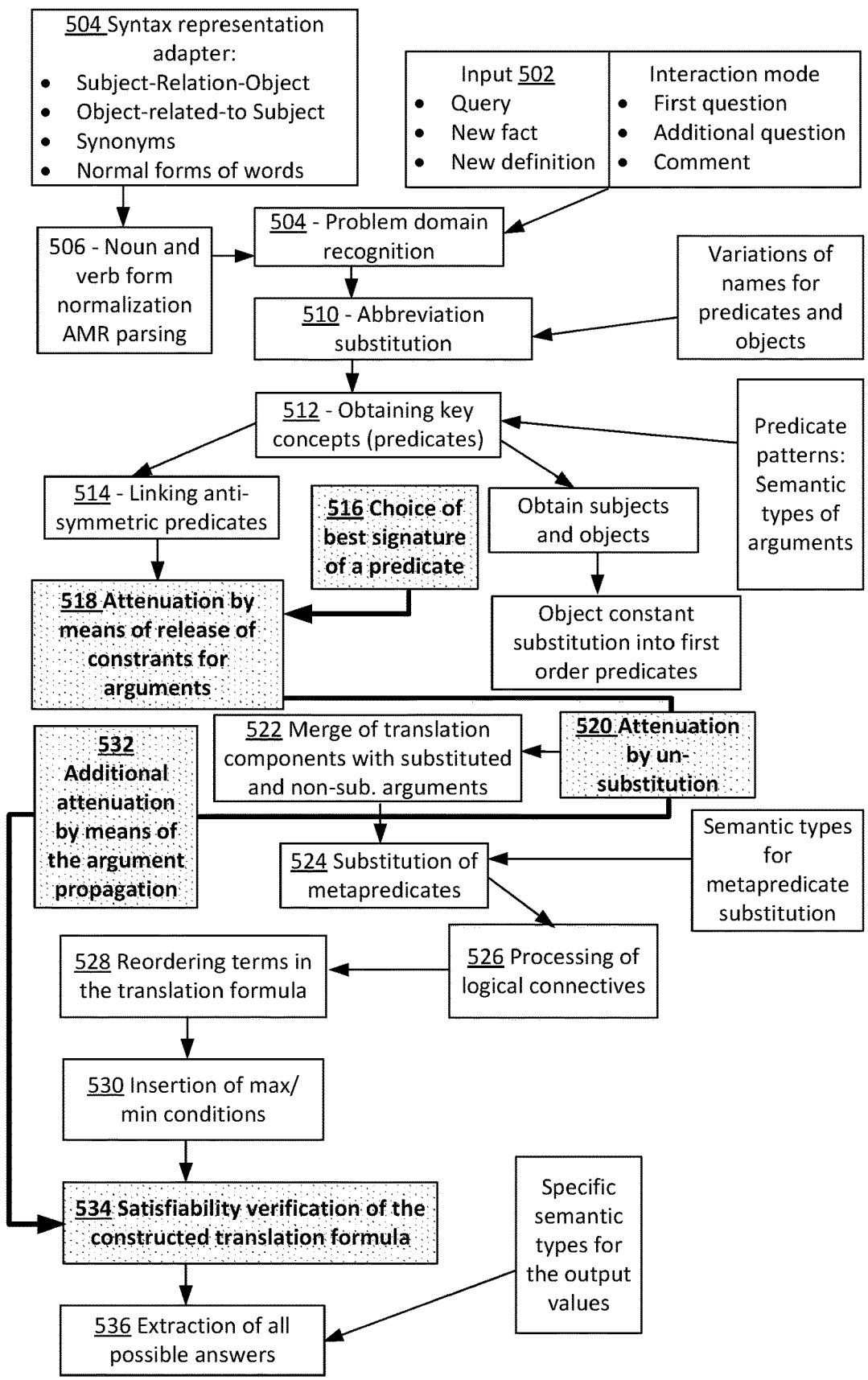
FIG. 5 depicts a block diagram depicting an example generality control process, according to at least one embodiment.

FIG. 5 depicts a block diagram depicting an example generality control process 500, according to at least one embodiment.

Generality control is a pragmatic context-dependent approach to building accurate logical representation of an input NL expression. It is based on an understanding that a particular logical form representation hypothesis is wrong when the LF representation is used to query the knowledge base and either zero or too many tuples of objects satisfy the query. Therefore, verification of the compatibility of query representation with domain serves as a strong criterion of the correctness of current representation hypothesis.

The existence of the best generality of a definition has computational rather than analytical (linguistic or cognitive) nature. Compatibility of a query representation with domain representation implements the feedback in the understanding procedure. Control of the generality representation is intended to compensate for the disagreements in the syntactic pre-processing and the application of semantic rules in abnormal situations. A query is usually expected to yield a limited number of answers (e.g., under a predefined threshold number). The DU system may determine the representation is wrong if, when used as a query against the knowledge base, it produces over the predefined threshold number of results. In some embodiments, the DU system may determine the representation is correct, when used as a query against the knowledge base, it produces a number of results that falls within a threshold range (e.g., meets or exceeds a lower threshold amount and meets or falls under a upper threshold amount).

In terms of the understanding algorithm, the query has to become more constrained if it yields too many answers, and should be attenuated in the opposite situation with no answers. Generality of a representation serves as a criterion of its correctness and determines the direction of its modification. The major portion of the semantic rules is specifically designed to be parameterized to control the QR.

As an example, consider a family of the hypotheses for the query representation for 'What is the export to the country that has the coal agreement with China?
1) export(XcountryFrom, XcountryTo, Xproduct), agreement(XcountryTo, china, Xproduct).
2) export(XcountryFrom, XcountryTo, coal), agreement (XcountryTo, china, coal).
3) export(XcountryFrom, XcountryTo, Xproduct), agreement(XcountryTo, XcountryFrom, coal).
4) export(XcountryFrom, XcountryTo, Xproduct), agreement(XcountryTo, XcountryWith, coal).
5) export(XcountryFrom, XcountryTo, Xproduct), agreement(XcountryFrom, china, coal).
6) export(XcountryFrom, XcountryTo, Xproduct), agreement(XcountryTo, china, coal).
7) export(XcountryFrom, XcountryTo, Xproduct), agreement(XcountryWith, china, coal).
8) export(XcountryFrom, XcountryFrom, Xproduct), agreement(XcountryFrom, china, coal).
9) export(XcountryFrom, XcountryTo, Xproduct), agreement(XcountryWith, china, coal).

The constraints of (1), (2), (3), and (8) are too strong as they produce too few results when executed against the knowledge base, and in (4), (7), and (9) the constraints are too loose, resulting too many. Representation (5) is incorrect because the query mentions export to the country such that . . . and not export from the country such that . . . Representation (1) is incorrect because it is not always true that the same product is necessarily the subject of both export and agreement. Representation (2) is incorrect as well because it is the partial case (less general) than (1): variable Xproduct is instantiated by coal. Representation (3) is stronger than the actual query because it says that the same pair of countries is linked with both export and agreement. In the representation 4) XcountryWith is supposed to be substituted with china. The problem of representation (7) is that two conjunctive terms are not connected via any variable (continuity rule has not been applied) and therefore it can potentially yield too many answers. Hence, representation (6) may be determined to be correct using the generality control process. The following generality control process described herein is selects the correct representation and rejects both too general and too specific representations.

The generality control process is shown in FIG. 5 as being executed on top of a conventional question answering architecture. Prior to receiving the input 502, an offline process may be performed at 504 to identify subjects, objects, relations between the two, synonyms and the normal forms of words in an ontology. In some embodiments, noun and verb forms of the terms of the ontology may be normalized at 506 through AMR parsing.

At runtime, the input 502 can be received at 508. The input 502 can be one of 1) a query, 2) a fact, or 3) a definition. If the input 502 is determined to be a definition (e.g., through comparison of the input 502 and one or more logical form templates, the input query is subject to syntactic and semantic analysis, and is converted to AMR logical form. In some embodiments, at 510, variations of names for predicates and objects may be substituted for any abbreviations contained in the input 502.

At 512, key predicates are obtained. By way of example, predicate patterns (e.g., predefined logical form templates) may be utilized to identify predicates and arguments from the input 502. This may include obtaining subject and object and substituting objects into first order predicates.

At 514, anti-symmetric predicates may be linked. Then there are consecutive components of generality control that are executed so that each makes a choice or certain processing step with a backtracking mechanism. This mechanism assures that if the overall processing fails at certain component, the system navigates back and each component revises its decision and/or processing.

The first such component is a predicate signature selector executed at 516. For a text "Normal arterial blood oxygen saturation levels in humans are 95-100 percent. If the level is below 90 percent, it is considered low and called hypoxemia" Two predicate patterns might be suitable:

saturation (Oxygen, Percentage, Time)
saturation (Diving, Duration, Depth)

From the phrase Normal arterial blood oxygen modifier oxygen tells us that the first pattern should be used. However, if generality control fails and this signature selector component needs to produce another option, the second pattern can potentially be returned.

At 518, attenuation by the release of constraints by argument may be performed. This type of attenuation takes the logical form of the input 502 and considers the opportunity to release a constraint expressed by a variable shared by two predicates. By way of example, consider a logical form of the input 502 and the shared variable TimeOfDay. saturation (oxygen, 88, TimeOfDay), hypoxemia(patient, 86, TimeOfDay) so that the constraint expressed by this variable needs to be released: saturation (oxygen, 88, TimeOfDay1), hypoxemia(patient, 86, TimeOfDay2). For example, a patient is a having a low saturation in the morning which further drops in the evening: saturation (oxygen, 88, morning), hypoxemia(patient, 86, evening).

At 520, attenuation by unsubstitution module may be performed by substituting one or more predicate arguments with an unknown value. In the ongoing example (e.g., saturation (oxygen, 88, morning), hypoxemia(patient, 86, evening), hypoxemia in the evening may be substituted with Unknown (e.g., saturation (oxygen, 88, morning), hypoxemia(patient, Unknown, evening) to match with the knowledge base of multiple patients and their saturation levels.

At 522, a merge of translation components with substituted and non-substituted arguments occurs. At 524, metapredicates may be substituted and logical connectives may be processed at 526. At 528, the terms may be reordered in the translation formula and maximum and minimum conditions may be inserted at 530.

At 534, an additional attenuation by means of argument propagation module takes the input NL expression (e.g., input 502), identifies a variable shared by three or more predicates, and turns that variable into two distinct variables (preventing its propagation from one predicate to another). By way of example, saturation (oxygen, temp, morning), hypoxemia(patient, temp, evening), saturation (oxygen, temp, next morning) may be modified to: saturation (oxygen, temp, morning), hypoxemia(patient, temp, evening), saturation (oxygen, temp next moring, next morning), turning temp temp next morning, to describe the temperature evolution accurately and without a loss of generality.

At 534, the DU system may run the constructed translation formula against the knowledge base to extract all possible answers at 536. If there are zero or too many results, it is assumed that one of the modules above made a wrong choice and backtracking is performed to determine a different choice. If there are too many results, each of the components (e.g., the components performing the operations of 518, 520, and 532) may be executed once more to modify the translation formula of input 502 to be more constrained; otherwise, if there are too few results, constraints are removed.

Returning to FIG. 2, if the generality control process executed at step 13 results in too many arguments, the method may proceed back to step 10. If the generality control process of step 13 results in too few results, the method may proceed back to step 8. If the generality control process of step 13 results in an un-satisfiable defining part/the definition is unacceptable, the method may proceed to step 4, where the user may be notified that the domain extension will not be made.

If the generality control process (either the first time executed or after a subsequent execution) results in an acceptable number, thus serving as verification that the definition can be satisfied with object and attributes it describes, the method may proceed to step 14, where the definition may be added to the ontology.

In some embodiments, the definition may be an additional definition for an entity for which a definition is already included in the ontology. The method may determine the same at step 7. In this use case, rather than proceed with step 8 as would be the case when the input NL expression is a definition of a new entity, the method may proceed along a slightly different path. For example, if the input NL expression is an additional definition to a known entity, the method may proceed to step 8.

At step 8, as described above, the defining parts of the input NL expression (e.g., the right part identified at step 2) may be converted to logical form representation using conventional conversion techniques. Firstly, the signature of the definiendum predicate is built. All parameters in the definiendum part (which are also present in defining part) form the arguments of the definiendum predicate. Those parameters which are instantiated (to have specific values) in the defining part propagate to the definiendum predicate and form the constant values of its arguments. For the definition "Latent *tuberculosis* of lungs without symptoms is an infectious disease usually caused by *Mycobacterium tuberculosis* bacteria." The definiendum part predicate=*tuberculosis* with a pattern=*tuberculosis*(Latent_type, Symptoms, Bacteria, Disease, Organ).

At step 9, when the definition is of a new entity, the logical form representation may be built by instantiating the arguments of the new predicate with the object mentioned in the part being defined.

At step 10, the DU system may once again verify the instantiation of the arguments of step 9. At step 11, the DU system adds a unary predicate to derive the desired values).

At step 12, the DU system may verify if the definition can be satisfied by determining there are objects and attributes it described by executing the generality process at step 13. If the definition is one that can be satisfied (e.g., based on determining that there are an acceptable number of objects and/or attributes it defines in the knowledge base), the method may proceed to step 16.

At step 16, the DU system may verify if the new definition is different from (e.g., not identical to) other definitions of the ontology. By way of example, the DU system may search the ontology for other definitions for the same definiendum and compare those found using a predefined set of rules to assess a similarity between the two. If the known definition (s) and the new definition are dissimilar (e.g., meets or exceeds a threshold amount of difference) the new definition may be added to the ontology at step 14. Else, the user may be notified at step 4 that the domain extension will not be made. In some embodiments, the notification provided at step 4, in any suitable use case discussed herein, may include with the notification a reason code and/or annotation describing one or more reasons for which the ontology was not updated.

Figure 6:
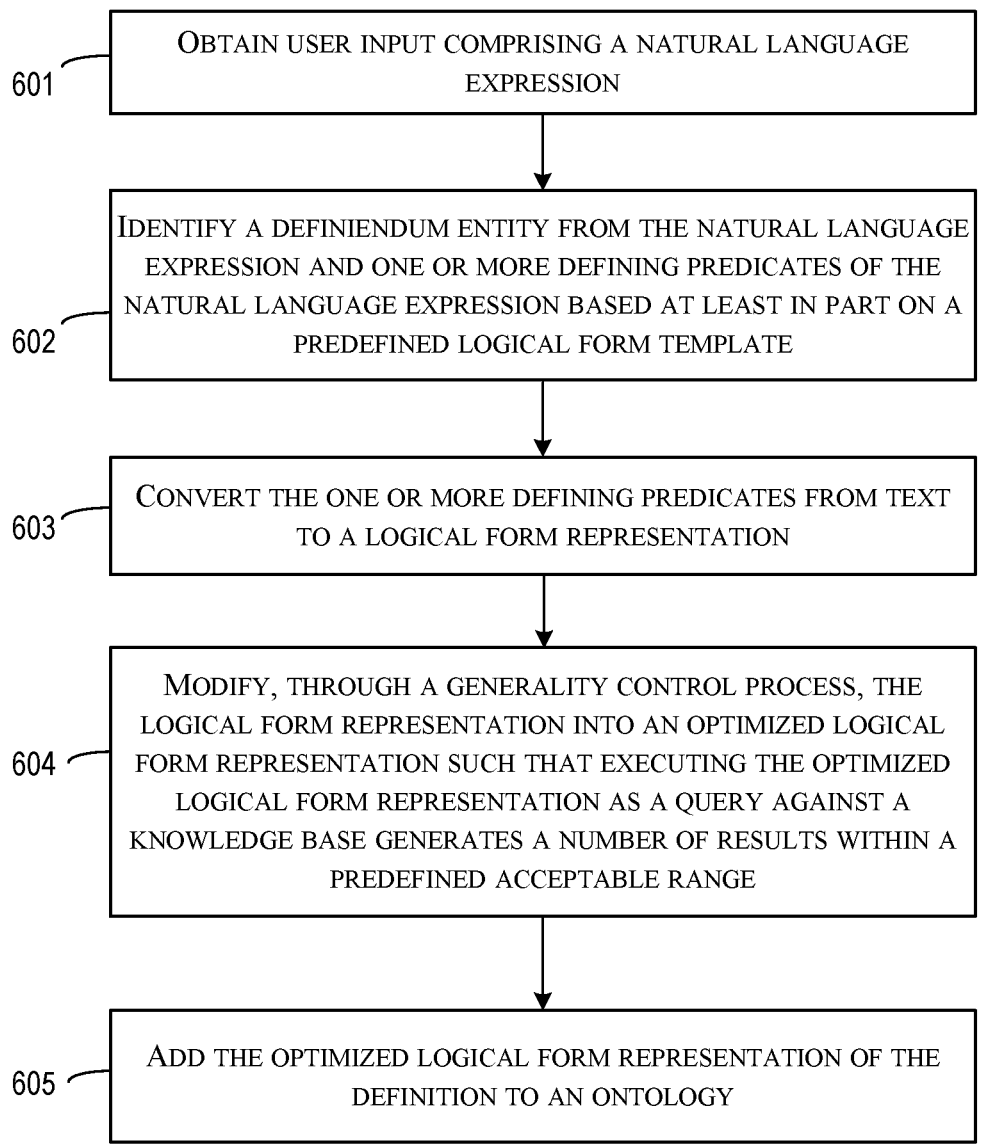
FIG. 6 depicts a flowchart illustrating an example method for generating, from a natural language expression, a new definition for an existing ontology, in accordance with at least one embodiment.

FIG. 6 depicts a flowchart illustrating another example of a method 600 for generating, from a natural language expression, a new definition for an existing ontology, in accordance with at least one embodiment. In some embodiments, the method 600 may be performed by the autonomous agent application 108 of FIG. 1 (e.g., an example of a DU system), or a DU system as described above that is separate from the autonomous agent application 108. In some embodiments, the operations of method 600 may be performed as an online process.

At 601, user input may be obtained. By way of example, the user input may include a natural language query. In some embodiments, the user input is received by a DU system (e.g., the autonomous agent application 108 of FIG. 1) from a user device (e.g., the user device 106 of FIG. 1) and is in the form of a natural language expression.

At 602, a definiendum entity and one or more defining predicates of the natural language expression may be identified (e.g., by the autonomous agent application 108 or the DU system if separate from the autonomous agent application 108) based at least in part on a predefined logical form template (e.g., the logical form template 302 of FIG. 3). In some embodiments, the predefined logical form template indicates common semantic patterns of definitions and the definiendum entity is a term that is being defined by a definition comprising the one or more defining predicates.

At 603, the one or more defining predicates may be converted from text to a logical form representation. By way of example, the defining parts of the natural language expression may be converted to logical form representation using conventional conversion techniques.

At 604, the logical form representation may be modified, through a generality control process (e.g., the generality control process 500 of FIG. 5), such that executing the optimized logical form representation as a query against a knowledge base generates a number of results within a predefined acceptable range (see, step 13 of FIG. 2).

At 605, the optimized logical form representation of the definition may be added to an ontology. In some embodiments, the definition may be added only after the autonomous agent application 108 (or DU system, if different from the autonomous agent application 108) has determined the definition is different from other definitions of the entity (if other definitions exist in the ontology for that entity). In some embodiments, a logical form representation of the definiendum may be added to the optimized logical form representation of the definition (e.g., the logical form representation of the one or more defining predicates, the right part of the definition) and the entire new definition may be added to the ontology.

Figure 7:
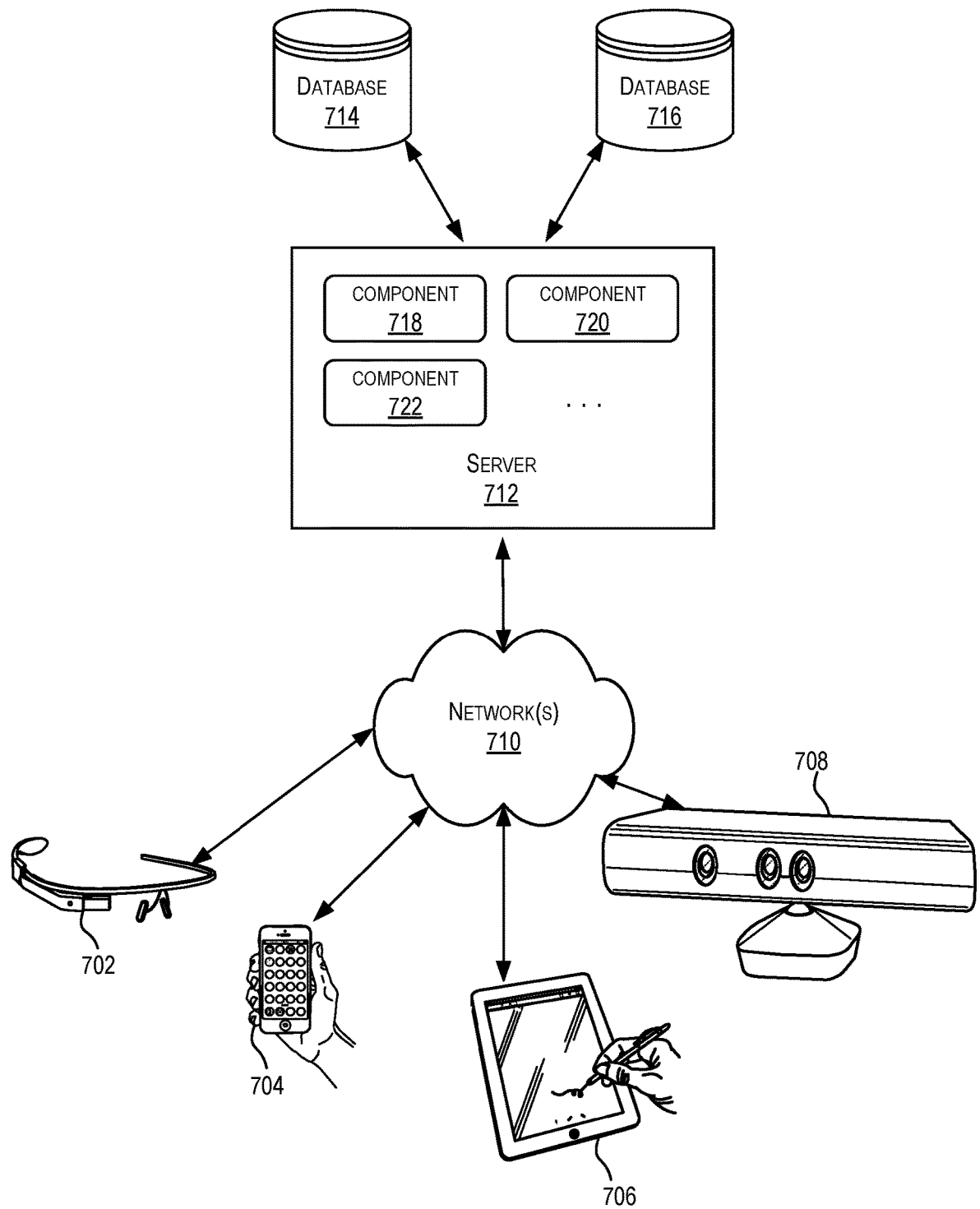
FIG. 7 depicts a simplified diagram of a distributed system for implementing one of the aspects.

FIG. 7 depicts a simplified diagram of a distributed system 700 for implementing one of the aspects. In the illustrated aspect, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network(s) 710.

In various aspects, server 712 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other aspects, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The aspect shown in the figure is thus one example of a distributed system for implementing an aspect system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various aspects, server 712 may be adapted to run one or more services or software applications described in the foregoing disclosure. For example, server 712 may correspond to a server for performing processing described above in accordance with an aspect of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of aspects, databases 714 and 716 may reside in a storage-area network (SAN). Similarly, any necessary files for performing the functions attributed to server 712 may be stored locally on server 712 and/or remotely, as appropriate. In one set of aspects, databases 714 and 716 may include relational databases, such as databases provided by Oracle, that are adapted to store, update, and retrieve data in response to SQL-formatted commands.

Figure 8:
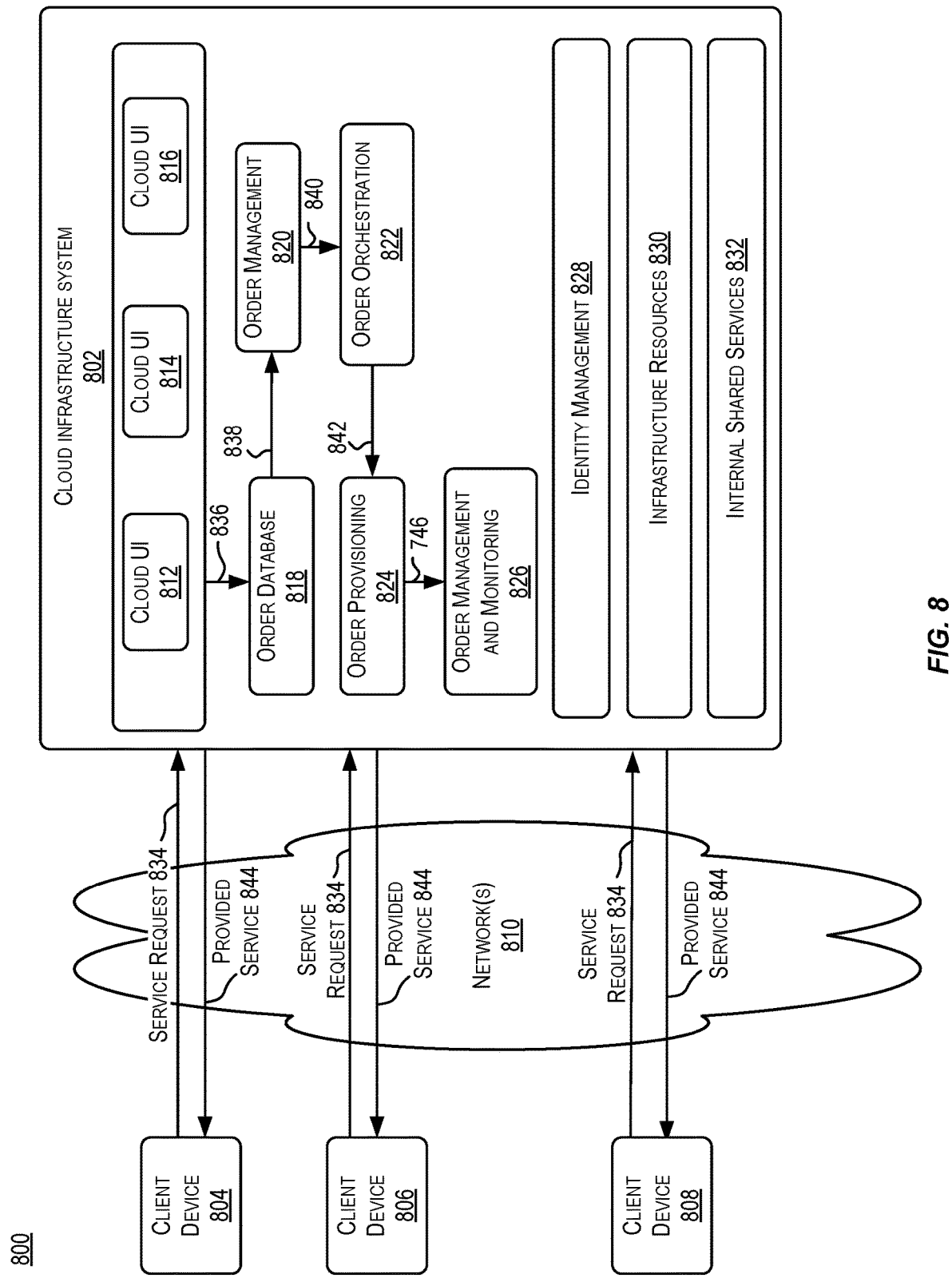
FIG. 8 is a simplified block diagram of components of a system environment by which services provided by the components of an aspect system may be offered as cloud services in accordance with an aspect.

FIG. 8 is a simplified block diagram of one or more components of a system environment 800 (e.g., a cloud infrastructure system) by which services provided by one or more components of an aspect system may be offered as cloud services, in accordance with an aspect of the present disclosure. In the illustrated aspect, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the aspect shown in the figure is only one example of a cloud infrastructure system that may incorporate an aspect of the invention. In some other aspects, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708 of FIG. 7.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 810.

Cloud infrastructure system 802 may comprise one or more computers and/or servers that may include those described above for server 712 of FIG. 7.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some aspects, the services provided by cloud infrastructure system 802 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some aspects, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support a shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 802 may also include infrastructure resources 830 for providing the resources used to provide various services to customers of the cloud infrastructure system. In one aspect, infrastructure resources 830 may include pre-integrated and optimized combinations of hardware, such as servers, storage, and networking resources to execute the services provided by the PaaS platform and the SaaS platform.

In some aspects, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 802, and the like.

In one aspect, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain aspects, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 in which the customer intends to subscribe.

After an order has been placed by the customer, the order information is received via the cloud UIs, 812, 814 and/or 816.

At operation 836, the order is stored in order database 818. Order database 818 can be one of several databases operated by cloud infrastructure system 802 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain aspects, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by system environment 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain aspects, system environment 800 may include an identity management module 828. Identity management module 828 may be configured to provide identity services, such as access management and authorization services in system environment 800. In some aspects, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.). Identity management module 828 may also include the management of descriptive information about each customer and about how and by whom that descriptive information can be accessed and modified.

Figure 9:
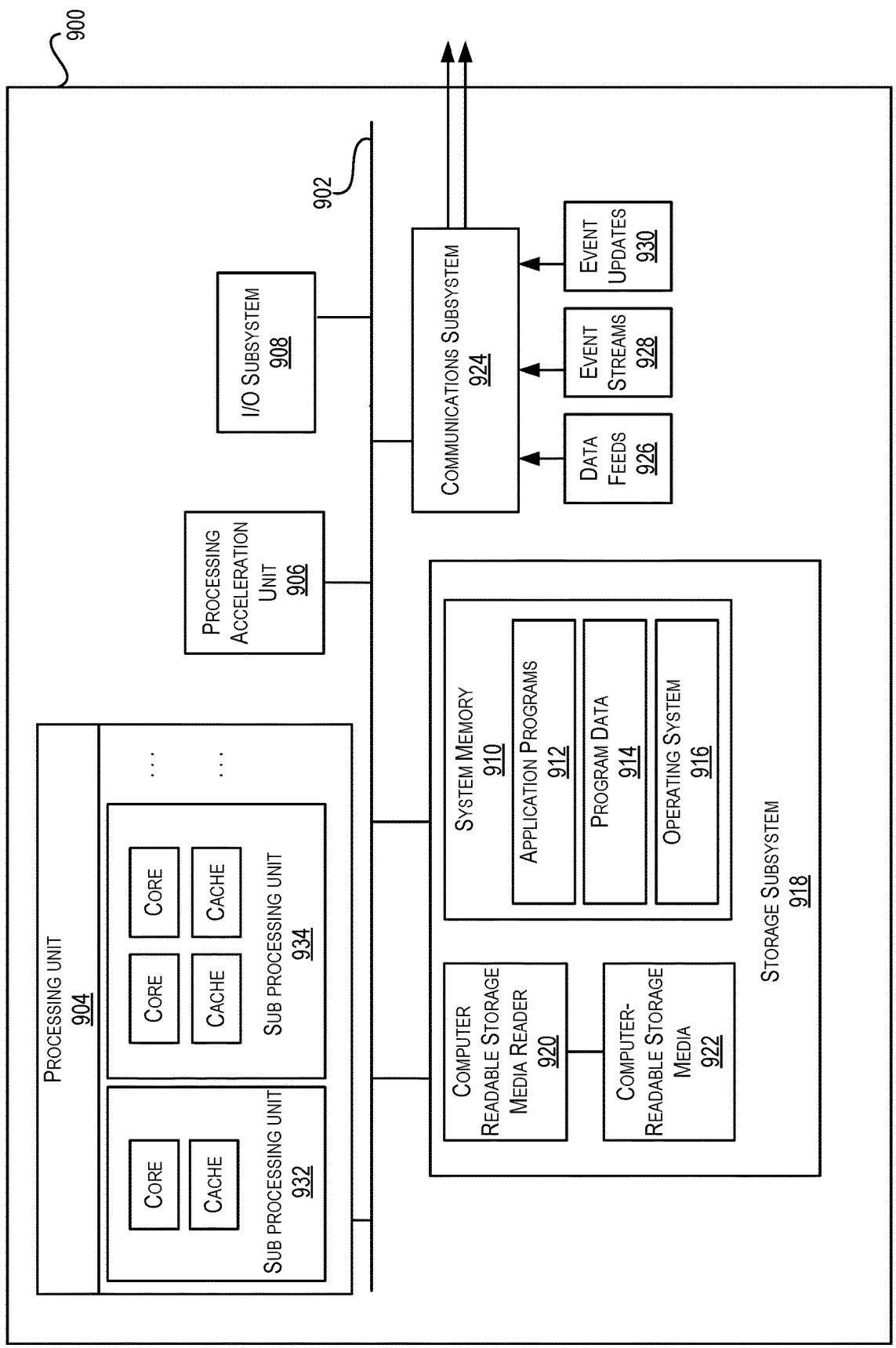
FIG. 9 illustrates an exemplary computer system, in which various aspects may be implemented.

FIG. 9 illustrates an exemplary computer system 900, in which various aspects may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain aspects, processing unit 904 may be implemented as one or more independent processing units 932 and/or 934 with single or multicore processors included in each processing unit. In other aspects, processing unit 904 may also be implemented as a quad-core processing unit formed by integrating two dual-core processors into a single chip.

In various aspects, processing unit 904 can execute a variety of programs in response to program code and can maintain multiple concurrently executing programs or processes. At any given time, some or all of the program code to be executed can be resident in processing unit 904 and/or in storage subsystem 918. Through suitable programming, processing unit 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some aspects. Software (programs, code modules, instructions) that when executed by a processor provide the functionality described above, may be stored in storage subsystem 918. These software modules or instructions may be executed by processing unit 904. Storage subsystem 918 may also provide a repository for storing data used in accordance with the present invention.

Storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 900.

By way of example, computer-readable storage media 922 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some aspects, communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 924 can provide wired network connectivity (e.g., Ethernet) in addition to or instead of a wireless interface.

In some aspects, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive unstructured data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for generating, from natural language input, a new definition for an ontology, the ontology comprising a tree-like data structure that organizes entities and identifies connections between the entities, the method comprising:
    obtaining, by a computing device configured to provide dialogue management, user input comprising a natural language expression;
    identifying, by the computing device, a definiendum entity from the natural language expression and one or more defining predicates of the natural language expression based at least in part on a predefined logical form template, the predefined logical form template indicating common semantic patterns of definitions, the definiendum entity being a term that is being defined by a definition comprising the one or more defining predicates;
    converting, by the computing device, the one or more defining predicates from text to a logical form representation;
    identifying, by the computing device through a generality control process, an optimized logical form representation for the logical form representation, the generality control process comprising generating a plurality of logical form representations of the definition, executing each of the plurality of logical form representations as a respective query against a knowledge base, and selecting the optimized logical form representation from the plurality of logical form representations based at least in part on a number of respective results each respective query generates;
    generating, by the computing device, an updated ontology based at least in part on adding the optimized logical form representation of the definition to the ontology; and
    generating, by the computing device, an answer for a subsequent question expressed in natural language as part of a dialogue, the answer being generated based at least in part on the updated ontology.

2. The method of claim 1, wherein the predefined logical form template indicates a first portion of a phrase that is a definiendum, a second portion of the phrase that is the one or more defining predicates, and a set of one or more terms linking the definiendum and the one or more defining predicates.

3. The method of claim 1, wherein identifying the definiendum entity and the one or more defining predicates of the user input includes:
    parsing the natural language expression to generate an abstract meaning representation of the natural language expression, the abstract meaning representation comprising a directed acyclic graph including a plurality of nodes and edges, the nodes representing discourse units of the natural language expression, and the edges specifying semantic relations between the nodes; and
    matching nodes of the abstract meaning representation against a particular predefined logical form template of a plurality of predefined logical form templates.

4. The method of claim 1, wherein the plurality of logical form representations comprise different predicate patterns.

5. The method of claim 4, wherein the generality control process further comprises at least one of:
    releasing a constraint expressed by a variable shared by two predicates of a candidate logical form representation of the definition of the plurality of logical form representations;
    substituting a value associated with an argument of a predicate of the candidate logical form representation of the definition; or
    generating a new variable from the variable shared by two or more predicates of the candidate logical form representation.

6. The method of claim 1, further comprising:
    identifying a plurality of arguments associated with each predicate of the one or more defining predicates; and
    adding a unary predicate corresponding to an argument of the plurality of arguments to the one or more defining predicates to cause the unary predicate to derive a set of predefined values that are verified by another defining predicate of the one or more defining predicates.

7. The method of claim 1, further comprising verifying compatibility of the optimized logical form representation of the definition with other definitions of the ontology, where in adding the optimized logical form representation of the definition is performed in response to verifying that the optimized logical form representation of the definition is compatible with the other definitions of the ontology.

8. A computing device configured to provide dialogue management and generate, from natural language input, a new definition for an ontology, the ontology comprising a tree-like data structure that organizes entities and identifies connections between the entities, the computing device comprising:
    a computer-readable medium storing non-transitory computer-executable program instructions; and
    a processing device communicatively coupled to the computer-readable medium for executing the non-transitory computer-executable program instructions, wherein executing the non-transitory computer-executable program instructions with the processing device causes the computing device to perform operations comprising:
        obtaining user input comprising a natural language expression;
        identifying a definiendum entity from the natural language expression and one or more defining predicates of the natural language expression based at least in part on a predefined logical form template, the predefined logical form template indicating common semantic patterns of definitions, the definiendum entity being a term that is being defined by a definition comprising the one or more defining predicates;

converting the one or more defining predicates from text to a logical form representation;

identifying through a generality control process, an optimized logical form representation for the logical form representation, the generality control process comprising 1) generating a plurality of logical form representations of the definition, each logical form representation comprising different predicate patterns, 2) executing each of the plurality of logical form representations as a respective query against a knowledge base, and 3) selecting the optimized logical form representation from the plurality of logical form representations based at least in part on a number of respective results each respective query generates; and generating, by the computing device, an updated ontology based at least in part on adding the optimized logical form representation of the definition to the ontology; and generating, by the computing device, an answer for a subsequent question expressed in natural language as part of a dialogue, the answer being generated based at least in part on the updated ontology.

9. The computing device of claim 8, wherein the predefined logical form template indicates a first portion of a phrase that is a definiendum, a second portion of the phrase that is the one or more defining predicates, and a set of one or more terms linking the definiendum and the one or more defining predicates.

10. The computing device of claim 8, wherein identifying the definiendum entity and the one or more defining predicates of the user input includes:

parsing the natural language expression to generate an abstract meaning representation of the natural language expression, the abstract meaning representation comprising a directed acyclic graph including a plurality of nodes and edges, the nodes representing discourse units of the natural language expression, and the edges specifying semantic relations between the nodes; and matching nodes of the abstract meaning representation against a particular predefined logical form template of a plurality of predefined logical form templates.

11. The computing device of claim 8, wherein each of the plurality of logical form representations comprise different predicate patterns.

12. The computing device of claim 11, wherein the generality control process further comprises at least one of:

releasing a constraint expressed by a variable shared by two predicates of a candidate logical form representation of the definition of the plurality of logical form representations;

substituting a value associated with an argument of a predicate of the candidate logical form representation of the definition; or generating a new variable from the variable shared by two or more predicates of the candidate logical form representation.

13. The computing device of claim 8, wherein the operations further comprise:

identifying a plurality of arguments associated with each predicate of the one or more defining predicates; and adding a unary predicate corresponding to an argument of the plurality of arguments to the one or more defining predicates to cause the unary predicate to derive a set of predefined values that are verified by another defining predicate of the one or more defining predicates.

14. The computing device of claim 8, wherein the operations further comprise verifying compatibility of the optimized logical form representation of the definition with other definitions of the ontology, where in adding the optimized logical form representation of the definition is performed in response to verifying that the optimized logical form representation of the definition is compatible with the other definitions of the ontology.

15. A non-transitory computer-readable storage medium storing computer-executable program instructions for providing dialogue management and for generating, from natural language input, a new definition for an ontology, the ontology comprising a tree-like data structure that organizes entities and identifies connections between the entities, wherein when executed by a processing device, the program instructions cause the processing device to perform operations comprising:

obtaining user input comprising a natural language expression;

identifying a definiendum entity from the natural language expression and one or more defining predicates of the natural language expression based at least in part on a predefined logical form template, the predefined logical form template indicating common semantic patterns of definitions, the definiendum entity being a term that is being defined by a definition comprising the one or more defining predicates;

converting the one or more defining predicates to a logical form representation;

identifying through a generality control process, an optimized logical form representation for the logical form representation, the generality control process comprising generating a plurality of logical form representations of the definition, each logical form representation comprising different predicate patterns, executing each of the plurality of logical form representations as a respective query against a knowledge base; and selecting the optimized logical form representation from the plurality of logical form representations based at least in part on a number of respective results each respective query generates;

generating an updated ontology based at least in part on adding the optimized logical form representation of the definition to the ontology; and generating an answer for a subsequent question expressed in natural language as part of a dialogue, the answer being generated based at least in part on the updated ontology.

16. The non-transitory computer-readable storage medium of claim 15, wherein identifying the definiendum entity and the one or more defining predicates of the user input includes:

parsing the natural language expression to generate an abstract meaning representation of the natural language expression, the abstract meaning representation comprising a directed acyclic graph including a plurality of nodes and edges, the nodes representing discourse units of the natural language expression, and the edges specifying semantic relations between the nodes; and matching nodes of the abstract meaning representation against a particular predefined logical form template of a plurality of predefined logical form templates.

17. The non-transitory computer-readable storage medium of claim 15, wherein
each of the plurality of logical form representations comprise different predicate patterns.

18. The non-transitory computer-readable storage medium of claim 17, wherein the generality control process further comprises at least one of:
releasing a constraint expressed by a variable shared by two predicates of a candidate logical form representation of the definition of the plurality of logical form representations;
substituting a value associated with an argument of a predicate of the candidate logical form representation of the definition; or
generating a new variable from the variable shared by two or more predicates of the candidate logical form representation.

19. The non-transitory computer-readable storage medium of claim 15, wherein the operations further comprise:
identifying a plurality of arguments associated with each predicate of the one or more defining predicates; and
adding a unary predicate corresponding to an argument of the plurality of arguments to the one or more defining predicates to cause the unary predicate to derive a set of predefined values that are verified by another defining predicate of the one or more defining predicates.

20. The non-transitory computer-readable storage medium of claim 15, wherein the operations further comprise verifying compatibility of the optimized logical form representation of the definition with other definitions of the ontology, where in adding the optimized logical form representation of the definition is performed in response to verifying that the optimized logical form representation of the definition is compatible with the other definitions of the ontology.

* * * * *

UNITED STATES PATENT AND TRADEMARK OFFICE
CERTIFICATE OF CORRECTION

PATENT NO. : 11,599,725 B2
APPLICATION NO. : 17/099212
DATED : March 7, 2023
INVENTOR(S) : Boris Galitsky Page 1 of 1

It is certified that error appears in the above-identified patent and that said Letters Patent is hereby corrected as shown below:

On the Title Page

On page 3, Column 2, under item [56], Other Publications, Line 7, delete "Semiink:" and insert -- Semlink: --, therefor.

In the Specification

In Column 3, Line 55, delete "toe." and insert -- to e. --, therefor.

In Column 6, Line 3, delete "center')" and insert -- center, --, therefor.

In Column 6, Line 24, delete "xyear)." and insert -- xyear)). --, therefor.

In Column 9, Line 11, delete "FIG. 4." and insert -- FIG.4). --, therefor.

In Column 9, Line 34, delete "tuberculosis)" and insert -- tuberculosis). --, therefor.

In Column 11, Line 16, delete "templates," and insert -- templates), --, therefor.

In Column 11, Line 64, delete "evening)" and insert -- evening)) --, therefor.

In Column 12, Line 13, delete "next morning)" and insert -- next_morning) --, therefor.

In Column 12, Line 15, delete "temp next moring, next morning)," and insert -- temp_next_morning, next_morning), --, therefor.

In Column 12, Lines 15-16, delete "turning temp temp next morning," and insert -- turning temp→temp_next_morning, --., therefor.

Signed and Sealed this
Second Day of January, 2024

Katherine Kelly Vidal
*Director of the United States Patent and Trademark Office*